(12) United States Patent
Blaha

(10) Patent No.: US 9,648,866 B2
(45) Date of Patent: May 16, 2017

(54) DEPLOYABLE HUNTING CANOPY

(71) Applicant: Roger Neal Blaha, Canton, MI (US)

(72) Inventor: Roger Neal Blaha, Canton, MI (US)

( * ) Notice: Subject to any disclaimer, the term of this patent is extended or adjusted under 35 U.S.C. 154(b) by 0 days.

(21) Appl. No.: 14/947,184

(22) Filed: Nov. 20, 2015

(65) Prior Publication Data

US 2016/0143264 A1 May 26, 2016

Related U.S. Application Data

(60) Provisional application No. 62/082,472, filed on Nov. 20, 2014.

(51) Int. Cl.
*E04H 15/04* (2006.01)
*A01M 31/02* (2006.01)
*E04H 15/00* (2006.01)

(52) U.S. Cl.
CPC ......... *A01M 31/025* (2013.01); *E04H 15/001* (2013.01); *E04H 15/04* (2013.01)

(58) Field of Classification Search
CPC ....... E04H 15/48; E04H 15/001; E04H 15/28; E04H 15/04; E04H 15/58; E04H 15/38; A45B 2023/0093; A01M 31/025; A01M 31/02
USPC ........ 135/90, 98, 143, 157–158, 120.4, 901, 135/96, 133, 152–153; 182/187, 92; 43/1
See application file for complete search history.

(56) References Cited

U.S. PATENT DOCUMENTS

| | | | | |
|---|---|---|---|---|
| 3,116,808 A * | 1/1964 | Riley | ................... | A01M 31/02 108/135 |
| 4,458,707 A * | 7/1984 | Lindaman | ............... | A45B 25/18 135/16 |
| 4,739,785 A * | 4/1988 | Poulson | ................ | E04H 15/001 135/117 |
| 4,836,231 A * | 6/1989 | Peterson | ................ | A45B 17/00 135/117 |
| 5,518,083 A * | 5/1996 | Blennert | ............... | A01M 31/02 182/188 |
| 6,499,496 B1 * | 12/2002 | Young | ..................... | E04H 15/04 135/117 |
| 7,516,707 B2 * | 4/2009 | Schrot | .................... | A01M 31/02 108/152 |
| 8,393,343 B2 * | 3/2013 | VanVonderen | ........ | E04F 11/181 135/16 |
| 9,232,783 B2 * | 1/2016 | Blackwell | ............. | A01M 31/02 |
| 2001/0009158 A1 * | 7/2001 | O'Hare | ............... | A01M 31/025 135/90 |
| 2006/0249640 A1 * | 11/2006 | Hanson | ............... | A01M 31/025 248/214 |
| 2014/0311829 A1 * | 10/2014 | Priest | .................... | A01M 31/02 182/187 |

\* cited by examiner

*Primary Examiner* — Winnie Yip
(74) *Attorney, Agent, or Firm* — Vincent Re PLLC

(57) ABSTRACT

A cover device useful for hunting is disclosed. The device includes a deployable canopy including canopy fabric, a plurality of ribs providing structure to the canopy fabric, and a bracket. The bracket includes a bracket axle connecting with each of the ribs, wherein the axle permits the ribs to alternatively be arranged in a deployed state with the ribs fanned out and stretching the canopy fabric and a collapsed state with the ribs being in a parallel configuration. The device further includes a gripping plate configured to be attached to a post.

12 Claims, 8 Drawing Sheets

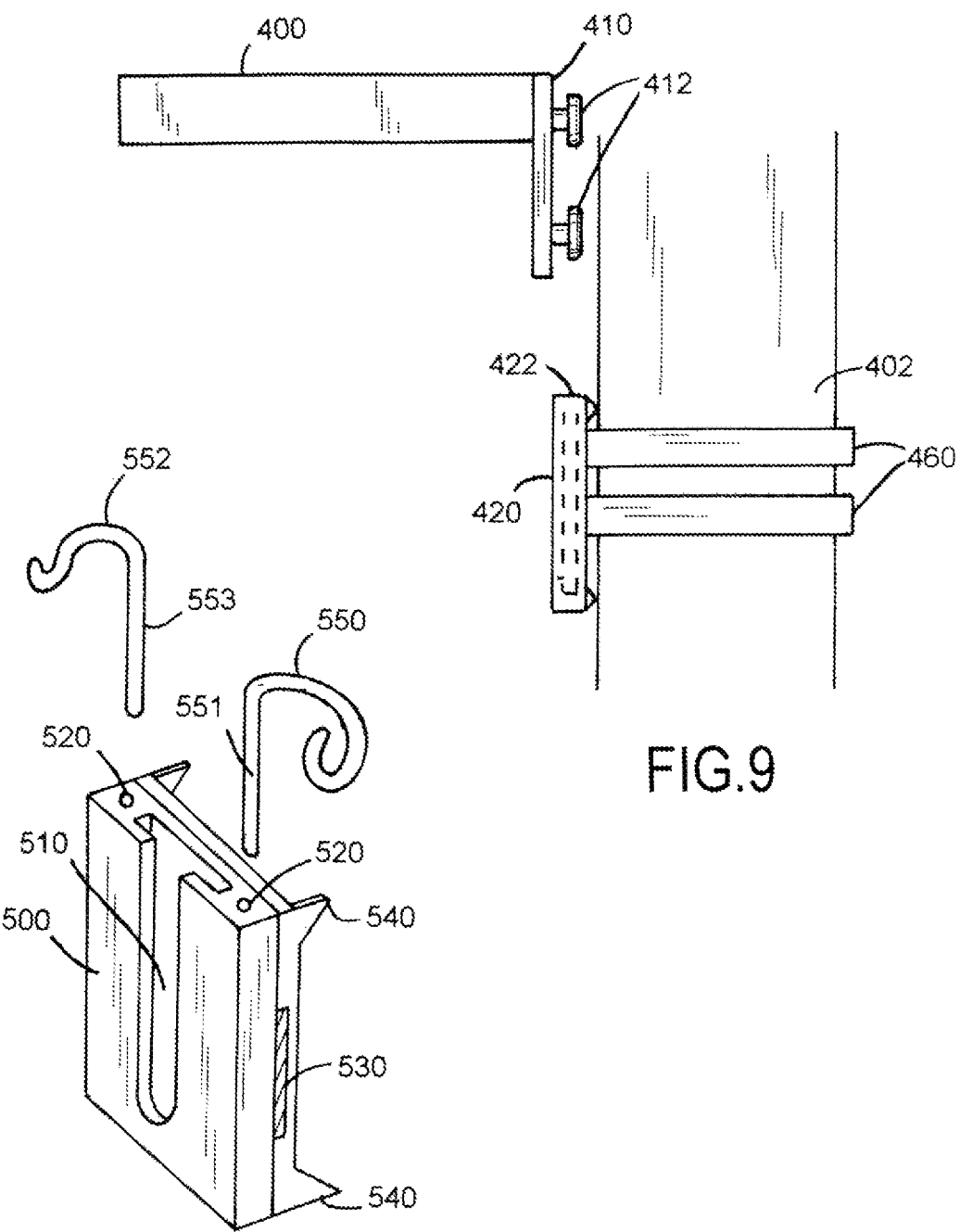

DEPLOYABLE HUNTING CANOPY

CROSS REFERENCE TO RELATED APPLICATIONS

This disclosure claims the benefit of U.S. Provisional Application No. 62/082,472 filed on Nov. 20, 2014 which is hereby incorporated by reference.

TECHNICAL FIELD

This disclosure is related to an object for use in hunting. In particular, the disclosure is related to a device used to provide a rapidly deployed shelter for a hunter.

BACKGROUND

The statements in this section merely provide background information related to the present disclosure. Accordingly, such statements are not intended to constitute an admission of prior art.

Hunters, in particular deer hunters, need to stand or sit outside in cold weather for long periods. Weather can be difficult. Snow can fall from trees.

Hunters that own a field are known to construct permanent shelters out of plywood or other materials. Such shelters provide the hunter with shelter from weather, wind, and cold. Such shelters additionally provide the hunter with cover, making it difficult for deer and other animals to see the hunter.

In the alternative to permanent shelters, hunters use deployable tree stands to elevate the hunter off of ground level. Known tree stands frequently include a lightweight seat and tension straps that can loop around and secure the seat to a tree trunk.

Camping tents are known providing shelter for a camper. Tents typically rest upon the ground. Tents can include nylon, cloth fabric, or other fabric materials stretched over tent poles providing structure for the tent. Tent poles are known to be made of fiberglass, wood, and other similar rigid and lightweight materials. Tents are frequently constructed of lightweight and compact materials, such that a tent can be easily carried within a backpack and deployed at a campsite.

Hunting blinds are known in the art with similar to tent constructions. Exemplary hunting blinds can include fabric stretched over structural poles and can include an open or opening window for the hunter to shoot through.

Hunters can use a firearm, a bow, or a crossbow to hunt an animal. Different hunting tools can have different space requirements to operate, for example, with a bow hunter requiring clearance to vertically align the bow and pull the bow string.

SUMMARY

A cover device useful for hunting is disclosed. The device includes a deployable canopy including canopy fabric, a plurality of ribs providing structure to the canopy fabric, and a bracket. The bracket includes a bracket axle connecting with each of the ribs, wherein the axle permits the ribs to alternatively be arranged in a deployed state with the ribs fanned out and stretching the canopy fabric and a collapsed state with the ribs being in a parallel configuration. The device further includes a gripping plate configured to be attached to a post.

BRIEF DESCRIPTION OF THE DRAWINGS

One or more embodiments will now be described, by way of example, with reference to the accompanying drawings, in which:

FIG. 9 illustrates an exemplary hunter's perch utilizing a two-piece gripping plate and perch mounting plate assembly, in accordance with the present disclosure;

FIG. 10 illustrates an exemplary gripping plate including a plurality of convenience features mounting to mounting holes in the gripping plate, in accordance with the present disclosure.

DETAILED DESCRIPTION

Figure 1:
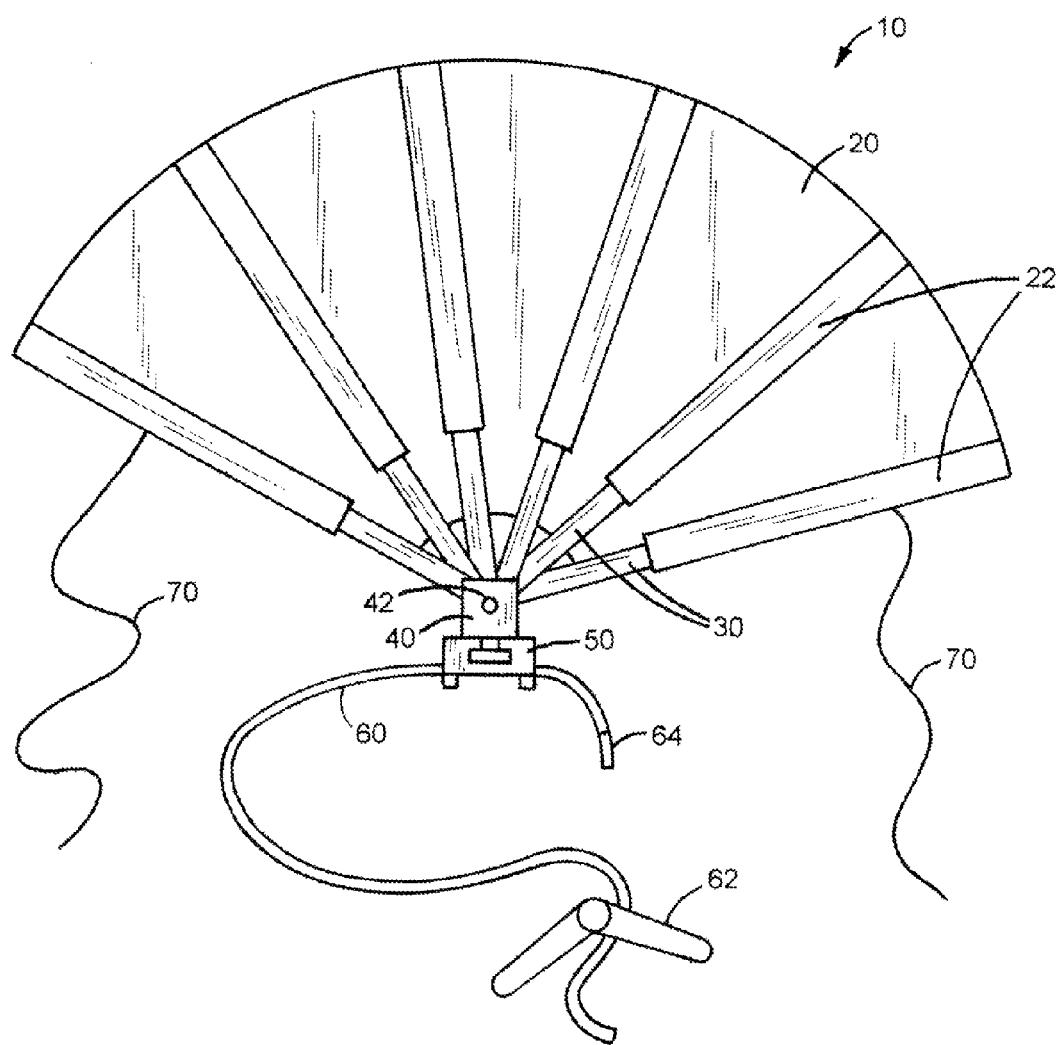
FIG. 1 illustrates an exemplary deployable canopy configured to be strapped to a tree and provide cover to a person sitting thereunder, in accordance with the present disclosure.

FIG. 1 illustrates an exemplary deployable canopy configured to be strapped to a tree and provide cover to a person sitting under the canopy. Deployable canopy 10 is illustrated including canopy fabric 20, ribs 30, rib bracket 40, gripping plate 50, mounting strap 60, and deployment tethers 70. Ribs 30 are attached to rib bracket 40 at bracket axle 42 and are free to pivot with respect to rib bracket 40, such that the ribs can alternate between a deployed, fanned out state and a parallel, collapsed state. In the deployed state, canopy fabric 20 is stretched out to provide maximum coverage under deployable canopy 10. In the collapsed state, deployable canopy 10 is provided in a compact form such as can easily be put into a cylindrical carry/storage bag.

Canopy fabric 20 includes rib enclosures 22 configured to receive ribs 30. According to one embodiment, rib enclosures 22 can include cylindrically shaped pockets formed in or attached to the canopy fabric 20. In other embodiments, strips of material, metallic rings attached to the canopy fabric 20, or other similar structures can be used to attach ribs 30 to canopy fabric 20. Deployment tethers 70 are attached to deployable canopy 10 such that pulling on tethers 70 causes the canopy to expand into the deployed state. Canopy fabric 20 can be constructed of nylon or other polymer materials similar to modern tent materials known in the art. In another embodiment, canopy fabric 20 can be constructed of cloth or some other fabric known in the art. Canopy fabric 20 can be a single color. Canopy fabric 20 can include a camouflage pattern. Canopy fabric 20 can include a transparent or translucent plastic material.

The canopy can be configured in a number of different shapes. The deployable canopy 10 of FIG. 1 is illustrated as a portion of a circle. Other non-limiting examples of shapes can include rectangles, squares, triangles, ovals, and trapezoids. The canopy is preferably waterproof.

In the embodiment of FIG. 1, rib bracket 40 and gripping plate 50 are a two-piece design such that that gripping plate 50 can be installed to a tree trunk or other structure, and rib bracket 40 can be selectively attached or removed from the gripping plate 50. In the embodiment of FIG. 1, rib bracket 40 includes one or more mushroom shaped tabs configured to fit into a slot in gripping plate 50. Gripping plate 50 can include gripping features configured to increase retention of the gripping plate 50 to bark of a tree.

Mounting strap 60 is attached to gripping plate 50 and is configured to be wrapped around a tree trunk or similar structure, be cinched down, and provide retention of the gripping plate 50 to the tree trunk. Buckle 64 is configured to be attached to buckle/cinching mechanism 62 such that tension can be created in strap 60.

Ribs 30 can be made of any of a number of materials. According to one embodiment, ribs 30 can be metallic, for example, constructed of steel, aluminum, or other commonly available metals or alloys. In another example, ribs 30 can be constructed with fiberglass poles, such as are commonly known in the art. Such fiberglass poles are constructed according to methods known in the art and can include metallic attachments on one side or the other. For example, a fitting over one side of the fiberglass pole can include a hole configured to receive bracket axle 42 of FIG. 1. In another embodiment, ribs 30 can be constructed of a polymer such as a thermoplastic. In some embodiments, ribs 30 are flexible, enabling a hunter to reach up, bend the ribs down to clear snow or rain from a top of the deployable canopy 10, and then permit the ribs 30 to elastically return to their original position.

Figure 2:
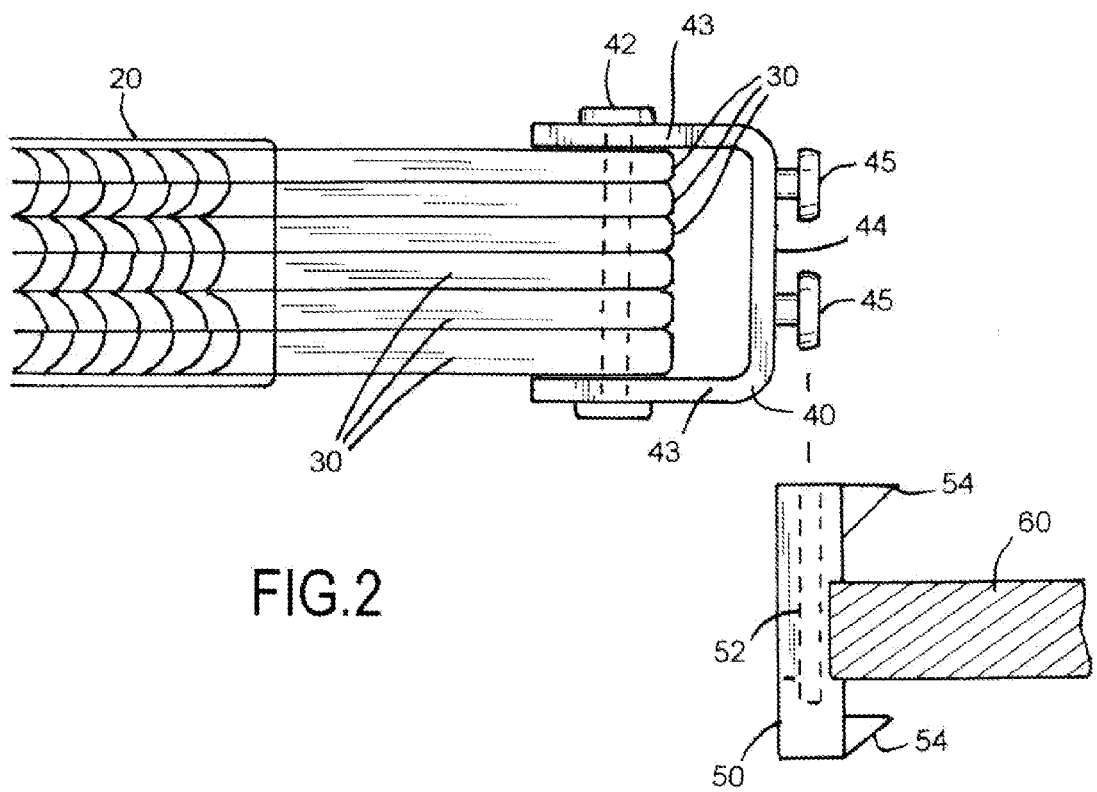
FIG. 2 illustrates the deployable canopy of FIG. 1 in profile, focusing upon a bracket holding canopy ribs with the ribs illustrated in a parallel, collapsed state, in accordance with the present disclosure.

FIG. 2 illustrates the deployable canopy of FIG. 1 in profile, focusing upon a bracket holding canopy ribs with the ribs illustrated in a parallel, collapsed state. Bracket 40 is illustrated including bracket arms 43 and a bracket center 44. Bracket arms 43 include a hole configured to receive bracket axle 42. Bracket center 44 includes features for mounting bracket 40 to a gripping plate. In the embodiment of FIG. 2, the features include mushroom shaped tabs 45 configured to fit a slot formed in a mating gripping plate.

Ribs 30 are illustrated attached to bracket axle 42 and rotated into a parallel configuration, with all of ribs 30 pointed in a same direction relative to bracket 40. Canopy fabric 20 is folded over ribs 30 similarly to how fabric of an umbrella is folded up when the umbrella is closed in a collapsed state.

Gripping plate 50 is illustrated in side view including slot 52 configured to receive tabs 45 and mounting strap 60. Gripping plate 50 further includes gripping features 54 embodied as sharp triangular posts configured to dig into and/or grip tree bark as mounting strap 60 is tightened.

Figure 3:
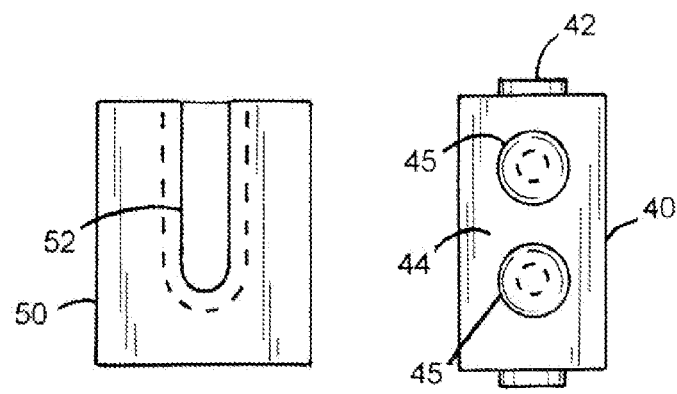
FIG. 3 illustrates the bracket and gripping plate of FIG. 2 from end views, in accordance with the present disclosure.

FIG. 3 illustrates the bracket and gripping plate of FIG. 2 from end views. Bracket 40 is illustrated including bracket center 44 including two tabs 45. Ends of bracket axle 42 are visible on top and bottom of bracket 40. Gripping plate 50 includes slot 52 including a wide interior channel and a narrower exterior channel configured to receive and hold tabs 45 as they are slid down slot 52.

Figure 4:
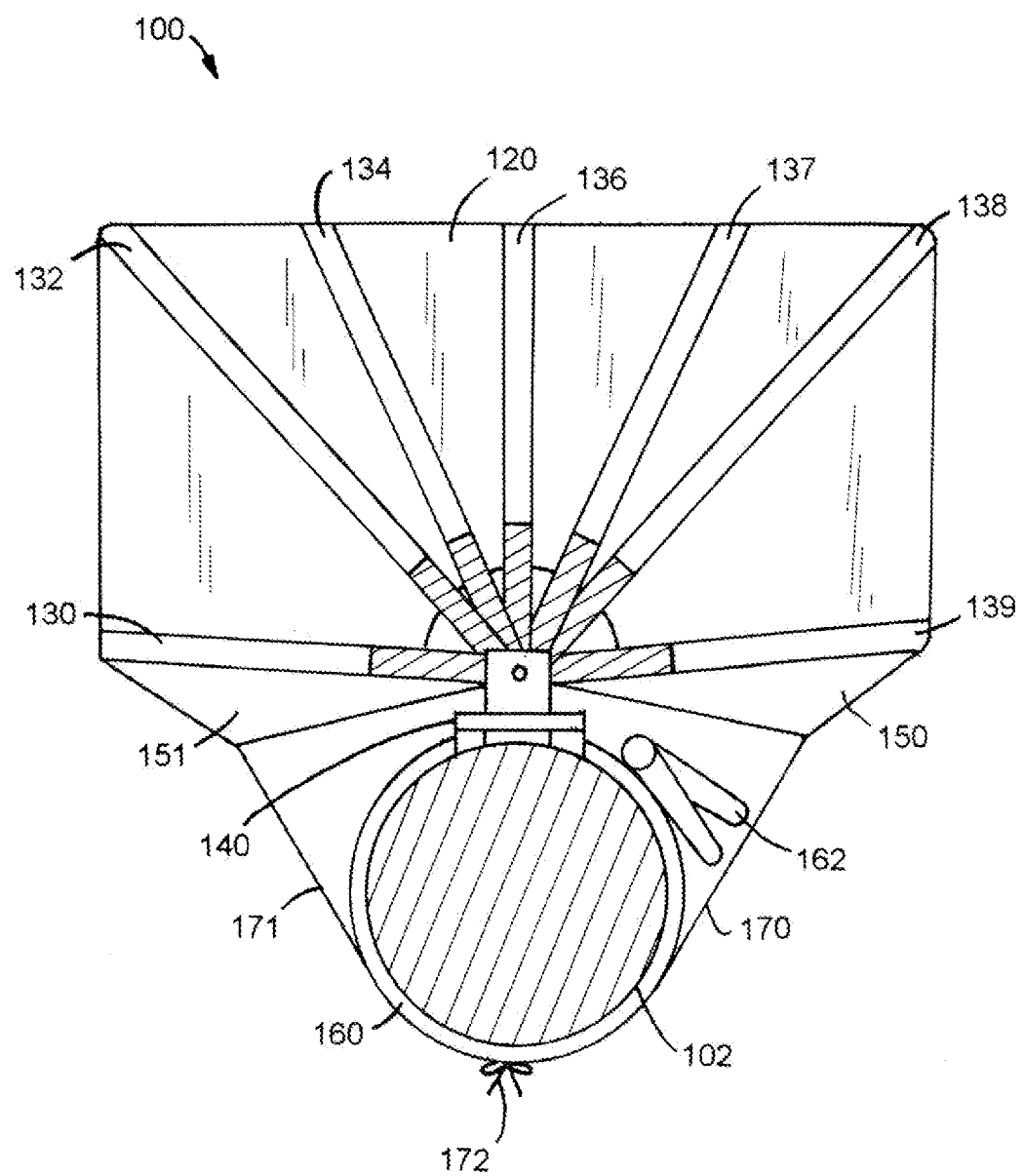
FIG. 4 illustrates an exemplary alternative embodiment of a deployable canopy, including a one-piece bracket and gripping plate, in accordance with the present disclosure.

FIG. 4 illustrates an exemplary alternative embodiment of a deployable canopy, including a one-piece bracket and gripping plate. Deployable canopy 100 is illustrated including canopy fabric 120; ribs 130, 132, 134, 136, 137, 138, and 139; one-piece bracket and gripping plate 140; mounting strap 160; and deployment tethers 170 and 171. Deployable canopy 100 is illustrated installed to tree trunk 102, with one-piece bracket and gripping plate 140 engaged to the tree trunk by tension created by mounting strap 160.

Ribs 130, 132, 134, 136, 137, 138, and 139 are sized corresponding to the rectangular shape of canopy fabric 120. Deployment tether wings 150 and 151 are attached to or extend from canopy fabric 120 on either side of the canopy fabric and attach to deployment tethers 170 and 171, respectively. Deployment tethers 170 and 171 are attached at tether knot 172 keeping tension in the tethers, thereby keeping the deployable canopy 100 in a deployed state.

Mounting strap 160 is illustrated attached and under tension through attachment and cinching of buckle/cinching mechanism 162. A number of strap cinching devices and methods are known in the art, and the disclosure is not intended to be limited to the exemplary embodiments disclosed herein.

Figure 5:
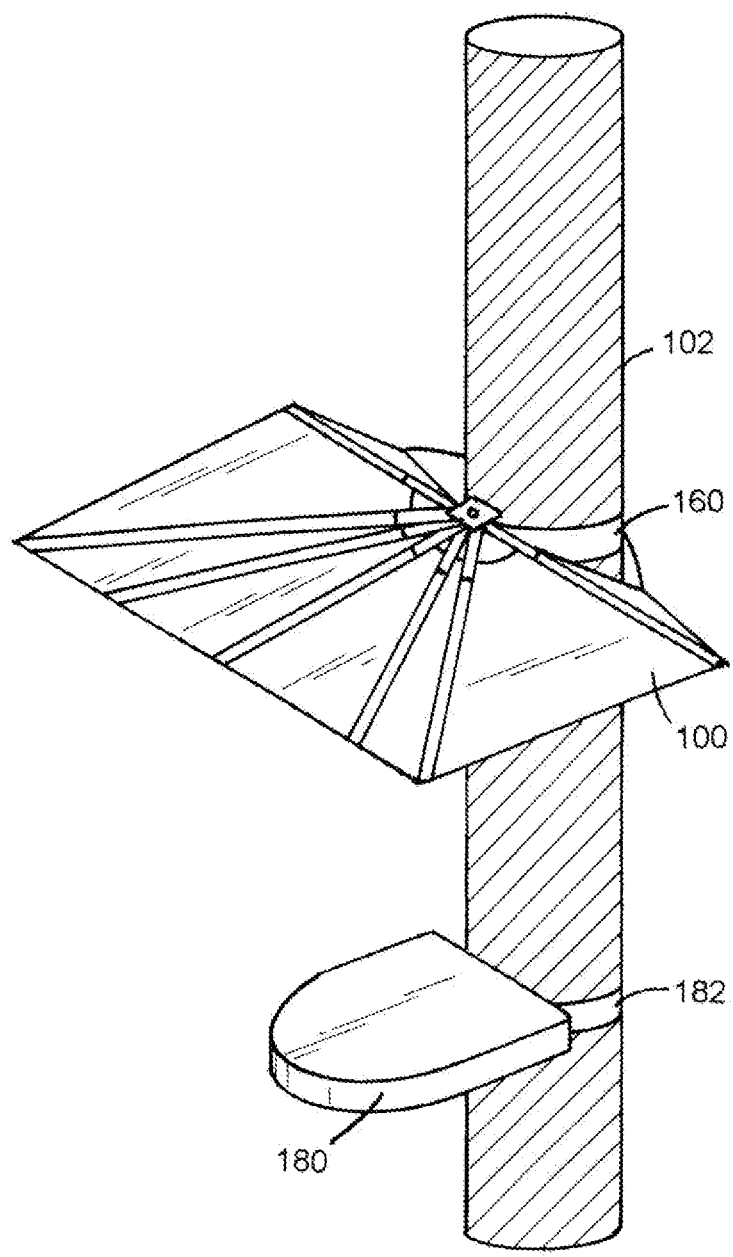
FIG. 5 illustrates the deployable canopy of FIG. 4 affixed to a tree trunk with a deployable hunter's perch additionally affixed to the tree trunk below the deployable canopy, in accordance with the present disclosure.

FIG. 5 illustrates the deployable canopy of FIG. 4 affixed to a tree trunk with a deployable hunter's perch additionally affixed to the tree trunk below the deployable canopy. Deployable canopy 100 is illustrates attached to tree trunk 102 with mounting strap 160. Hunter's perch 180 is illustrated attached to tree trunk 102 with mounting strap 182. Any known embodiment of a hunter's perch can be used with the presently disclosed deployable canopy.

Figure 6:
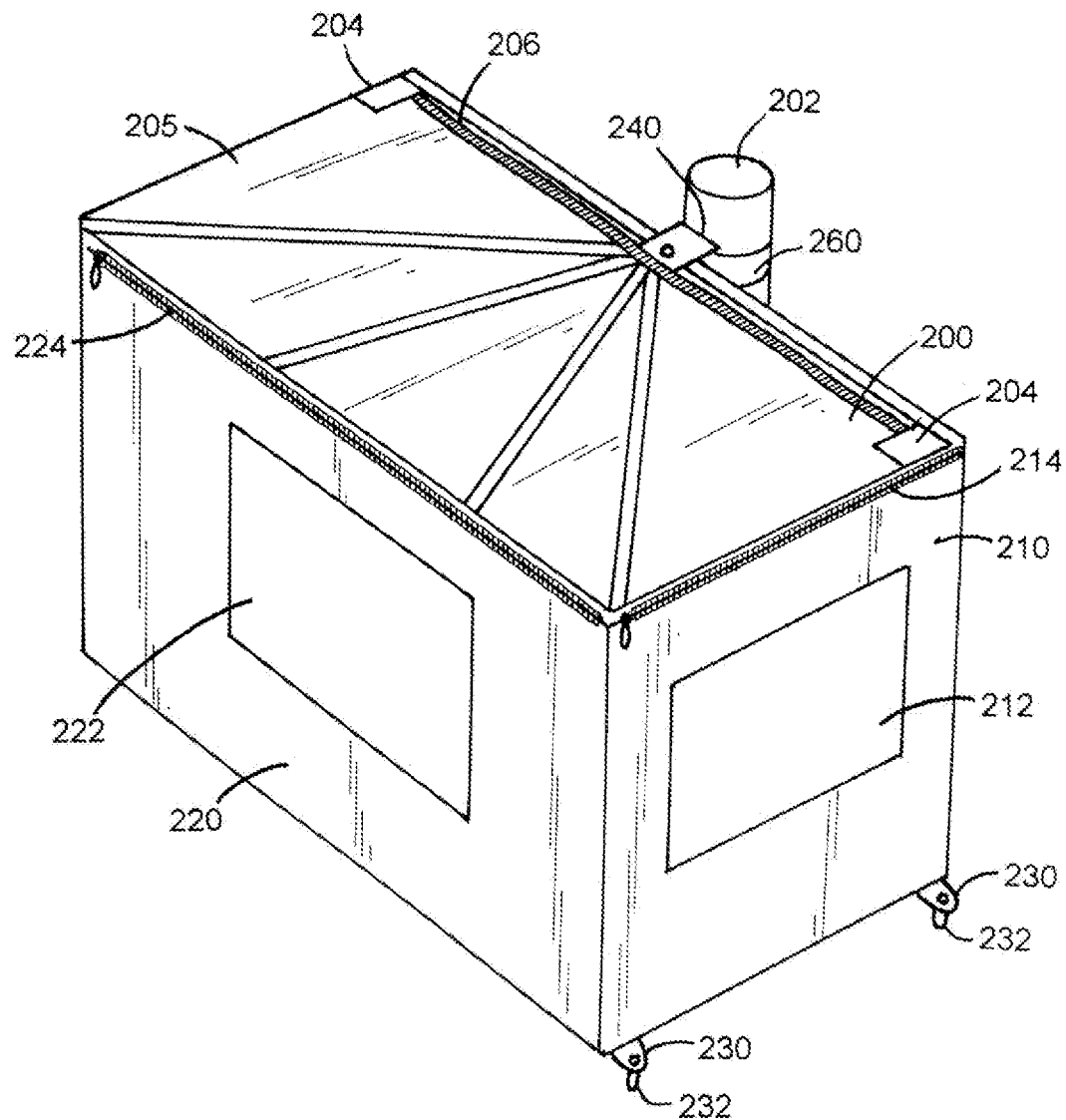
FIG. 6 illustrates an exemplary alternative embodiment of a deployable canopy including hunting blind walls affixed to the canopy, with the blind walls configured to be staked into the ground, in accordance with the present disclosure.

Deployable canopies can be mounted high in a tree, with a hunter's perch located just below the canopy. In other embodiments, deployable canopies can be mounted close to the ground. FIG. 6 illustrates an exemplary alternative embodiment of a deployable canopy including hunting blind walls affixed to the canopy. Deployable canopy 200 is illustrated attached to fence post 202 with mounting strap 260 and one-piece bracket and gripping plate 240. Hunting blind walls 210 and 220 are illustrated attached to canopy fabric 205 of deployable canopy 200 with exemplary zipper attachment features 214 and 224, respectively. In other embodiments, hunting blind walls can be formed unitarily with canopy fabric 205 or can attach with snaps, Velcro, or any other attachment mechanism known in the art. Hunting blind walls 210 and 220 each include a hunting window 212 and 222, respectively. It will be appreciated that similar walls can be attached on the other two sides of the deployable canopy 200, such that the hunter is entirely concealed within the hunting blind walls. In place of tether lines or strings, deployable canopy 200 is kept in a deployed state with a flexible fiberglass pole 206 installed to pockets 204 formed in canopy fabric 205. Hunting blind walls can include ground stake tabs 230 enabling use to ground stakes 232 to keep the walls from flapping in the wind.

Figure 7:
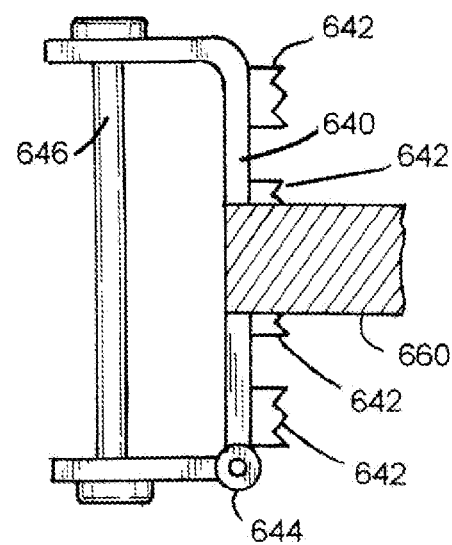
FIG. 7 illustrates an exemplary one-piece bracket and gripping plate, including a hinged bracket arm, in accordance with the present disclosure.

FIG. 7 illustrates an exemplary one-piece bracket and gripping plate, including a hinged bracket arm. One-piece bracket and gripping plate 640 is illustrated, including gripping features 642 and bracket axle 646. Mounting strap 660 is illustrated attached to one-piece bracket and gripping plate 640. One-piece bracket and gripping plate 640 further includes a hinge feature 644, permitting easy disassembly and/or adjustment of the bracket. A number of different gripping feature configurations are envisioned, and the disclosure is not intended to be limited to the particular examples provided herein.

Figure 8:
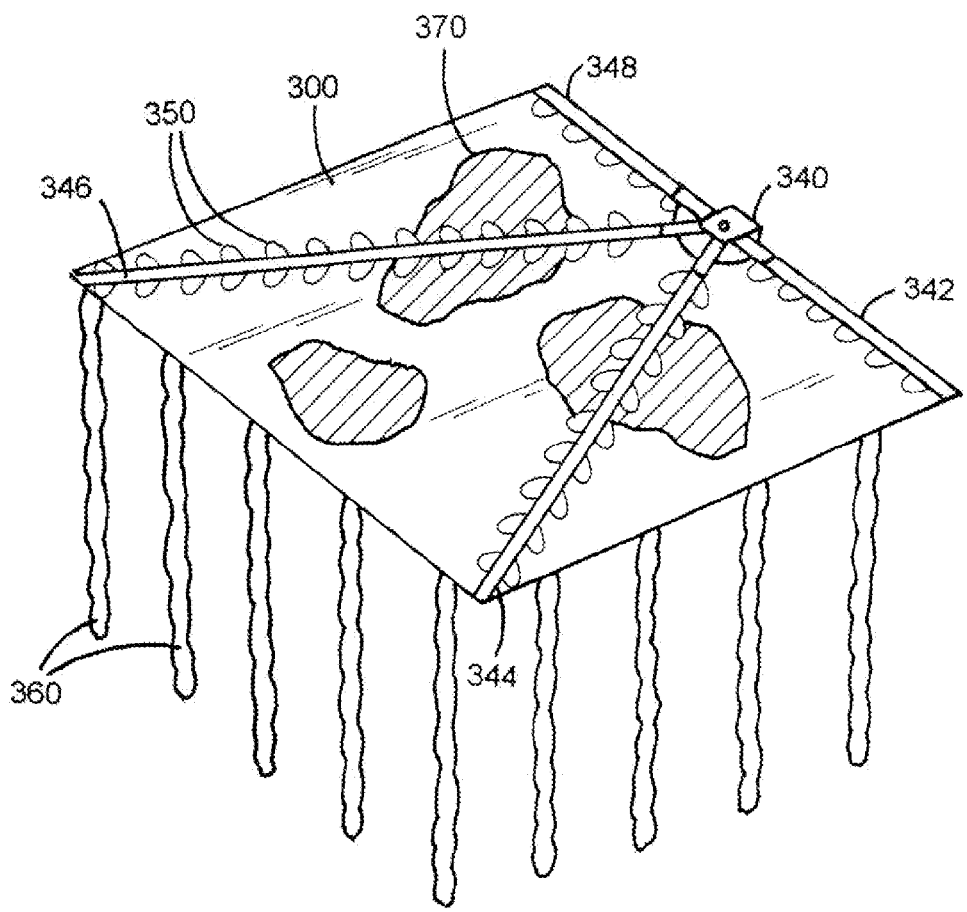
FIG. 8 illustrates an exemplary alternative embodiment of a deployable canopy including various camouflage elements, in accordance with the present disclosure.

FIG. 8 illustrates an exemplary alternative embodiment of a deployable canopy including various camouflage elements. Square-shaped deployable canopy 300 is illustrated, including ribs 342, 344, 346, and 348. Camouflage pattern 370 of a pattern known in the art is printed upon the surface of the canopy fabric. In addition, material tabs 350 are illustrated sticking up from a surface of the canopy fabric. Material tabs 350 break up the straight line profile of the top of the canopy when viewed from a distance. further, hanging ribbons 360 are provided hanging around a perimeter of deployable canopy 300, further providing visual cover for the hunter. Bracket 340 can be attached to a tree, a post, a wall of a shed, or any other structure through mounting straps or other fastening method. In embodiments where the post is non-living thing, nails, bolts, or other fasteners can be used to mount bracket 360 to the post.

FIG. 9 illustrates an exemplary hunter's perch utilizing a two-piece gripping plate and perch mounting plate assembly. Hunter's perch 400 is illustrated including perch mounting plate assembly 410 and attachment features 412. Mounting plate 420 is illustrated including slot 422 configured to receive and hold attachment features 412. A plurality of straps 460 can be used to affix mounting plate 420 to tree trunk 402. It will be appreciated that similar configurations could be used to support a line worker working on telephone pole utilities or suspend a seat wherever a pole or tree trunk is provided.

FIG. 10 illustrates an exemplary gripping plate including a plurality of convenience features mounting to mounting holes in the gripping plate. Gripping plate 500 is illustrated including slot 510 and gripping features 540. Convenience features 550 and 552 are illustrated embodied as bent wire sections including one of any number of hooks and rings. Convenience features 550 and 552 include straight sections 551 and 553, respectively, configured to fit within mounting holes 520 provided in gripping plate 500. A hunter can hang objects such as binoculars or deer antlers from convenience features 550 and 552. Slot 530 is provided to enable routing a mounting strap to the plate 500.

Figure 11:
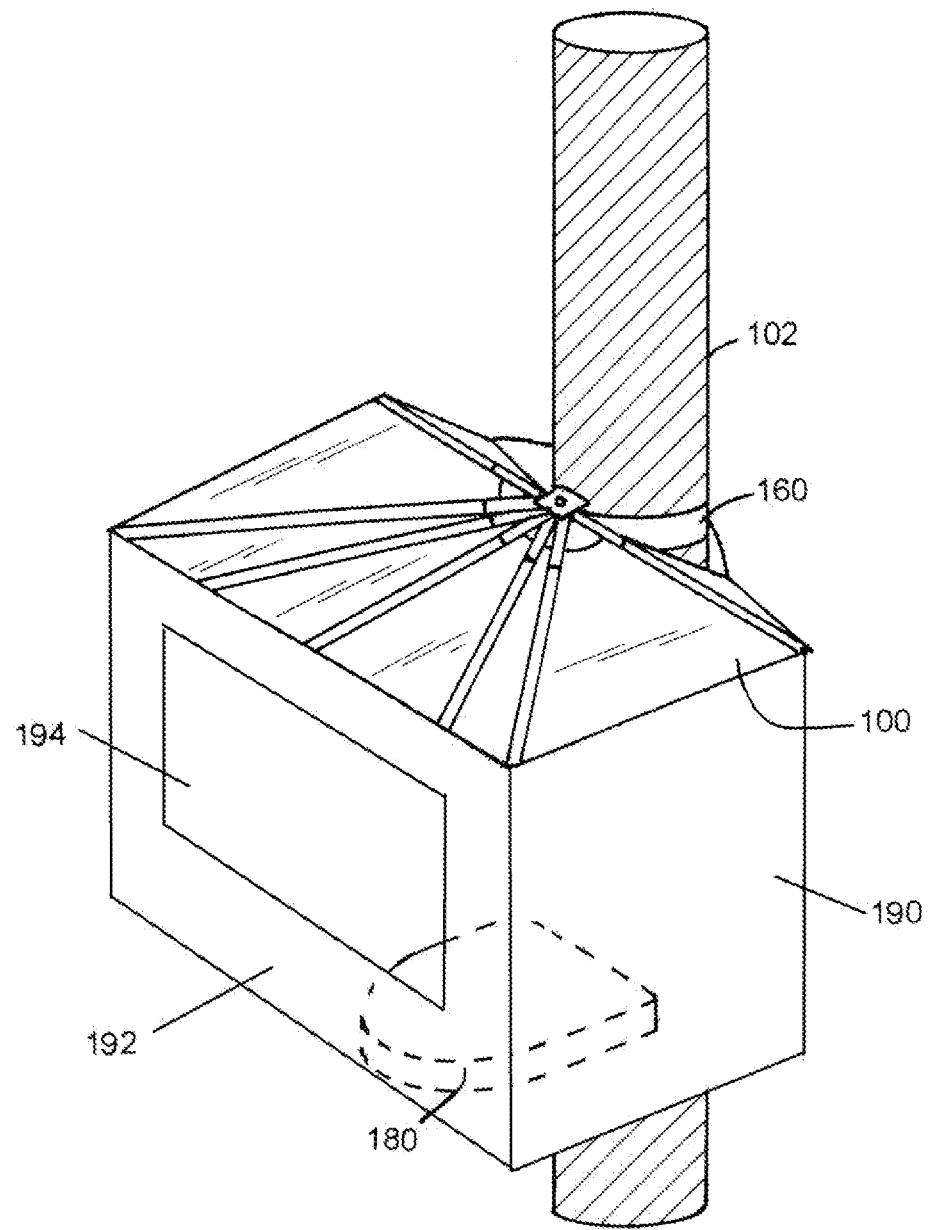
FIG. 11 illustrates the deployable canopy of FIG. 4 including hunting blind walls affixed to the canopy, wherein the blind walls are configured to be used with a hunter's perch on a tree trunk, in accordance with the present disclosure.

FIG. 11 illustrates the deployable canopy of FIG. 4 including hunting blind walls affixed to the canopy, wherein the blind walls are configured to be used with a hunter's perch on a tree trunk. Deployable canopy 100 is illustrated including mounting strap 160 installed to tree trunk 102. Hunter's perch 180 is illustrated installed to tree trunk 102 under canopy 100. Hunter's perch 180 is commonly referred to as a tree stand. Canopy 100 includes or is connected to blind walls 190 and 192. Blind wall 192 includes a window 194. Blind walls 190 and 192 can hang freely. In the alternative, blind walls 190 and 192 can include wire or pole structures or can be tied or otherwise secured to either perch 180 or tree trunk 102 under perch 180.

In the illustrations, mounting features including tabs are provided on the bracket and a slot is provided on the gripping plate. One will appreciate that the features could be reversed, with tabs on the gripping plate and an inverted slot on the bracket. Other similar mechanical joining features known in the art could be used to join a bracket and a gripping plate, and the disclosure is not intended to be limited to the examples provided herein.

The disclosed deployable canopy can be configured specially for use with firearms, crossbows, or bows, for example, providing clearance for use of the particular hunting instrument.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A cover device useful for hunting, the device comprising:
   a deployable canopy comprising:
     canopy fabric;
     a plurality of ribs providing a structure to the canopy fabric; and
     a bracket comprising a bracket axle connecting with each of the ribs, wherein the axle permits the ribs to alternatively be arranged in a deployed state with the ribs fanned out and stretching the canopy fabric and a collapsed state with the ribs being in a parallel configuration; and
   a gripping plate configured to be attached to a post;
   wherein the bracket comprises mounting features configured to affix the bracket to the gripping plate;
   wherein the mounting features comprise mushroom-shaped tabs; and
   wherein the gripping plate comprises a slot configured to receive the mushroom-shaped tabs.

2. The device of claim 1, further comprising a hunting blind wall attached to the canopy fabric.

3. The device of claim 2, wherein the hunting blind wall comprises ground stake attachment holes.

4. The device of claim 2, wherein the hunting blind wall is configured to be used with a hunter's perch.

5. The device of claim 1, further comprising tethers attached to opposite ends of the canopy fabric.

6. The device of claim 1, further comprising a mounting strap configured to affix the gripping plate to the post.

7. The device of claim 6, wherein the mounting strap is configured to affix the gripping plate to the post comprising a tree trunk.

8. The device of claim 6, wherein the mounting strap is configured to affix the gripping plate to the post comprising a fence post.

9. The device of claim 1, wherein the bracket comprises a hinge.

10. The device of claim 1, wherein the canopy fabric comprises camouflage features comprising one of material tabs and hanging ribbons configured to obscure a profile of the deployable canopy.

11. The device of claim 1, wherein the canopy fabric comprises transparent material.

12. A cover device useful for hunting, the device comprising:
   a deployable canopy comprising:
     canopy fabric;
     a plurality of ribs providing a structure to the canopy fabric;
     a bracket comprising:
       a bracket axle connecting with each of the ribs, wherein the axle permits the ribs to alternatively be arranged in a deployed state with the ribs fanned out and stretching the canopy fabric and a collapsed state with the ribs being in a parallel configuration; and mounting features comprising two mushroom-shaped tabs; and a gripping plate configured to be attached to a tree trunk, the gripping plate comprising a slot configured to receive the mushroom-shaped tabs.

\* \* \* \* \*